(12) United States Patent
Südow et al.

(10) Patent No.: US 8,472,281 B2
(45) Date of Patent: Jun. 25, 2013

(54) NOISE SUPPRESSION BY ADAPTIVE SPEED REGULATION OF TOWED MARINE GEOPHYSICAL STREAMER

(75) Inventors: Gustav Göran Mattias Südow, Vällingby (SE); Ulf Peter Lindqvist, Segeltorp (SE); Andras Robert Juhasz, Hagersten (SE); Rune Johan Magnus Mattsson, Schackvagen (SE)

(73) Assignee: PGS Geophysical AS, Lysaker (NO)

( * ) Notice: Subject to any disclaimer, the term of this patent is extended or adjusted under 35 U.S.C. 154(b) by 585 days.

(21) Appl. No.: 12/798,137

(22) Filed: Mar. 30, 2010

(65) Prior Publication Data

US 2011/0242940 A1    Oct. 6, 2011

(51) Int. Cl.
  *G01V 1/38* (2006.01)
  *G05D 1/02* (2006.01)

(52) U.S. Cl.
  CPC ............ *G01V 1/3808* (2013.01); *G05D 1/0206* (2013.01)
  USPC .............................................. 367/15; 701/21

(58) Field of Classification Search
  CPC   G05D 1/02; G05D 1/0206; G01V 1/38; G01V 1/3808
  USPC ........................ 367/19, 20, 15, 904
  See application file for complete search history.

(56) References Cited

U.S. PATENT DOCUMENTS

| | | | | |
|---|---|---|---|---|
| 3,159,806 A * | 12/1964 | Piasecki | .................. | 367/106 |
| 4,063,213 A * | 12/1977 | Itria et al. | .................. | 367/17 |
| 5,379,267 A * | 1/1995 | Sparks et al. | .................. | 367/18 |
| 5,665,909 A * | 9/1997 | Doherty et al. | .................. | 73/170.34 |
| 6,144,342 A | 11/2000 | Bertheas et al. | | |
| 7,376,045 B2 | 5/2008 | Falkenberg et al. | | |
| 7,737,698 B2 | 6/2010 | Tenghamn et al. | | |
| 2003/0208320 A1* | 11/2003 | Zajac | .................. | 702/14 |
| 2006/0256653 A1* | 11/2006 | Toennessen et al. | .................. | 367/16 |
| 2007/0127312 A1 | 6/2007 | Storteig et al. | | |
| 2007/0258322 A1* | 11/2007 | Hopperstad | .................. | 367/23 |
| 2009/0140723 A1* | 6/2009 | Ronaess et al. | .................. | 324/202 |
| 2009/0141587 A1* | 6/2009 | Welker et al. | .................. | 367/16 |
| 2009/0157242 A1* | 6/2009 | Holo et al. | .................. | 701/21 |
| 2009/0316526 A1* | 12/2009 | Grall | .................. | 367/20 |
| 2010/0017133 A1 | 1/2010 | Ziolkowski et al. | | |

FOREIGN PATENT DOCUMENTS

| | | |
|---|---|---|
| EP | 2128654 A2 | 4/2009 |
| GB | 2331971 A | 6/1999 |
| WO | 2009045109 A1 | 4/2009 |

OTHER PUBLICATIONS

DVS Doppler Volume Sampler, Teledyne RD Instruments Marine Measurements, www.rdinstruments.com, Apr. 2008.
International Search Report, Application No. PCT/EP2011/054200, dated May 10, 2012.

* cited by examiner

*Primary Examiner* — Mark Hellner
*Assistant Examiner* — Ari M Diacou

(57) ABSTRACT

A method for towing marine geophysical sensor streamers in a body of water includes moving a towing vessel at a selected speed along the surface of the body of water. At least one geophysical sensor streamer is towed by the vessel at a selected depth in the water. A velocity of the streamer in the water is measured at at least one position along the streamer. The selected speed of the towing vessel is adjusted if the measured velocity exceeds a selected threshold.

26 Claims, 2 Drawing Sheets

NOISE SUPPRESSION BY ADAPTIVE SPEED REGULATION OF TOWED MARINE GEOPHYSICAL STREAMER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine geophysical surveying. More particularly, the invention relates to methods and systems for adaptive speed control of towed marine streamers.

2. Background Art

Marine geophysical surveying systems include towed electromagnetic sensor streamers. Such sensor streamers are towed by a vessel at a selected depth in a body of water and include a plurality of electric field and/or magnetic field sensors disposed along the length of the streamer. The sensors generate signals related to electromagnetic fields induced in formations below the bottom of the body of water by a transmitter. See, for example U.S. Patent Application No. 2010/0017133.

As well explained in the '133 publication, a significant source of noise in the signals detected by the sensors in an electromagnetic streamer cable is from motion of the cable in the Earth's magnetic field. In marine seismic surveying, seismic streamers are towed at relatively shallow depths in the water, and for practical purposes it is assumed that the streamer velocity is approximately the same as the velocity of the towing vessel. In the case of marine electromagnetic surveying, the sensor streamers are towed at greater depth in the water. There is thus a weaker correlation between the velocity of the streamers in the water and the velocity of the tow vessel. If the actual velocity of the streamers at depth in the water becomes excessive as a result of subsurface water currents, excessive noise may be induced in the measurements made by the electromagnetic sensors.

There exists a need for measurement and control of streamer velocity at the selected towing depth.

SUMMARY OF THE INVENTION

A method for towing marine geophysical sensor streamers in a body of water according to one aspect of the invention includes moving a towing vessel at a selected speed along the surface of the body of water. At least one geophysical sensor streamer is towed by the vessel at a selected depth in the water. A velocity of the streamer in the water is measured at at least one position along the streamer. The selected speed of the towing vessel is adjusted if the measured velocity exceeds a selected threshold.

Other aspects and advantages of the invention will be apparent from the following description and the appended claims.

DETAILED DESCRIPTION

Figure 1:
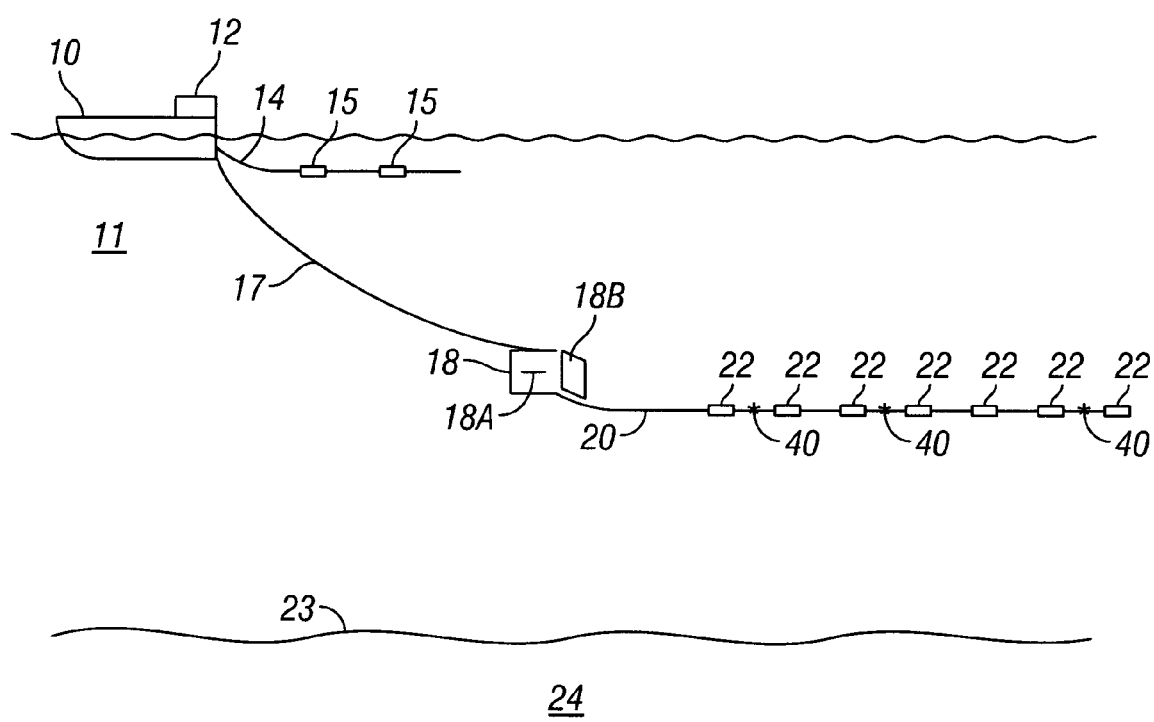
FIG. 1 shows an example towed marine geophysical sensor streamer.

FIG. 1 shows a geophysical survey vessel 10 moving along the surface of a body of water 11 such as a lake or the ocean. The vessel 10 may include equipment thereon, shown generally at 12 and referred to for convenience as a "recording system." The recording system 12 typically includes devices such as a data recording unit (not shown separately) for making a record with respect to time of signals generated by various sensors in the acquisition system. The recording system 12 also typically includes navigation equipment (not shown separately) to determine and record, at selected times, the geodetic position of the vessel 10.

The vessel 10 may tow one or more source cables 14. The source cable 14 may include thereon an electromagnetic energy source such as a pair of spaced apart electrodes 15. Operation of electromagnetic energy sources for geophysical surveying is well known in the art and need not be repeated here.

In the present example, a sensor streamer cable 20 may be towed at a selected depth in the water 11 and maintained at such depth by a depressor 18. The streamer cable 20 may include a plurality of longitudinally spaced apart electromagnetic sensors 22, non-limiting examples of which are magnetometers, wire coils, spaced apart electrodes, or combinations thereof. The sensors 22 detect components of electromagnetic energy in response to electromagnetic energy imparted into the formations 24 below the water bottom 23.

The depressor 18 in the present example receives power and control signals to change depth and direction (using control surfaces such as diving planes 18A and rudder 18B) from a lead in cable 17 connected from the depressor 18 to the vessel 10. The lead in cable 17 also includes electrical and/or optical conductors that enable real time communication of signals detected by the sensors 22 to the recording unit 12.

In other examples, the depressor 18 may be a passive device such as a weight. In still other examples, the depressor may be omitted entirely.

Figure 2:
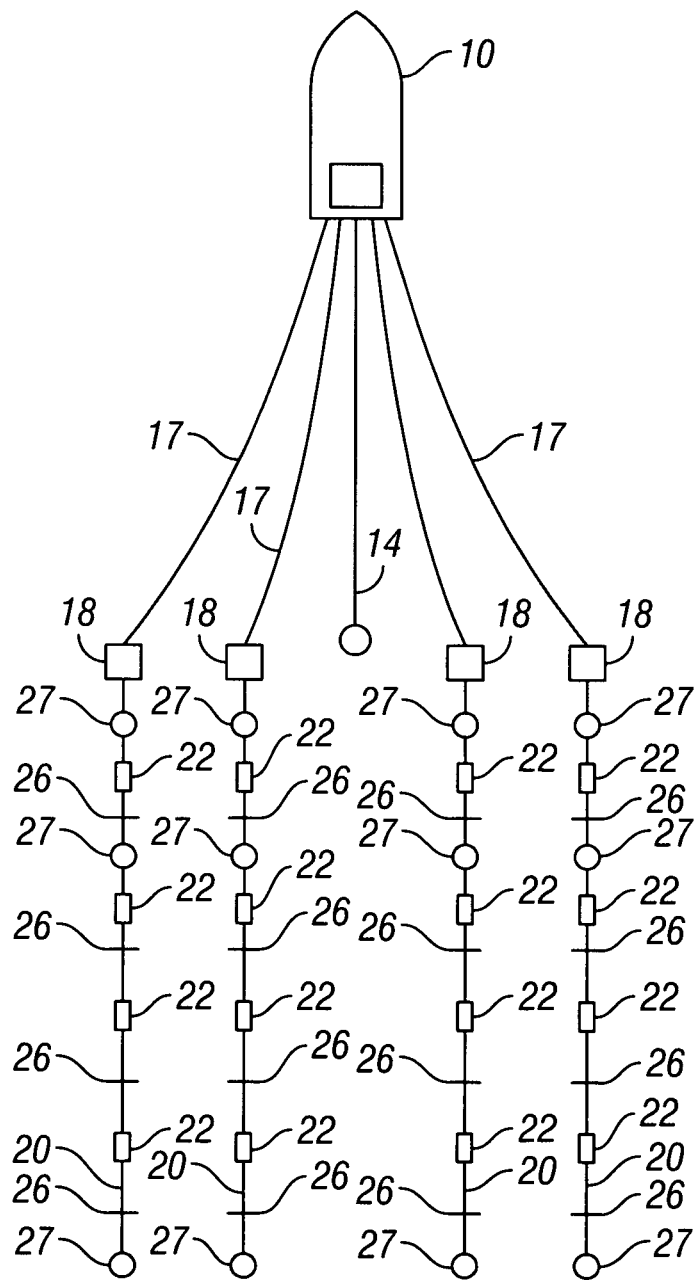
FIG. 2 shows a laterally spaced apart array of streamers.

If it is desirable to operate more than one streamer at the same time, FIG. 2 shows an example of how this may be performed using streamer cables having additional navigation components to avoid tangling and fouling. Each of four sensor streamers 20 as explained with reference to FIG. 1 may be coupled at its forward end to a respective depressor 18. Each depressor 18 may be coupled to the vessel 10 by a respective lead in cable 17 as explained above. In the present example, the streamers 20 may be caused to remain in a selected pattern (e.g., such as parallel as shown) and to be responsive to the effects of water cross currents to maintain such pattern by the use of lateral force and control (LFD) devices 26 disposed at selected positions along the streamers. See, for example, U.S. Pat. No. 6,144,342 issued to Bertheas et al. Lateral distance between the streamers 20 at selected points therealong (to maintain the selected pattern) may be determined using an acoustic range finding system, components of which are shown at 27. See for example, U.S. Pat. No. 7,376,045 issued to Falkenberg et al. and commonly owned with the present invention.

Referring once again to FIG. 1, because the streamer(s) are towed at substantial depth in the water, the actual velocity of the streamer at any point therealong may differ substantially from the velocity of the vessel 10 near the water surface. In the present example, one or more acoustic Doppler current profilers (ADCPs) 40 may be affixed to the exterior of the streamer 20. One suitable ADCP is sold under the trademark DOPPLER VOLUME SAMPLER, which is a trademark of Teledyne RD Instruments USA, 14020 Stowe Drive, Poway, Calif. 92064.

During operation of a system according to the invention, the ADCP 40 measures in-water velocity of the streamer. The velocity measurement may be conducted over the streamer 20 and lead in cable 17 to the recording unit 12. The recording unit 12 may be configured to automatically control the speed of the vessel 10 so that the velocity at the streamer 20 is reduced to a level consistent with acceptable levels of motion-induced noise (e.g., to below a selected threshold). Because the downward force exerted by the depressor 18 and the LFD devices (26 in FIG. 2) is dependent on the angle of attack of the respective control surfaces and the velocity, the recording unit 12 may transmit control signals to both the depressor 18 and the LFD devices (if used) to increase angle of attack of the depth control surfaces to maintain depth of the streamer(s) 20 in the water.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for towing one or more geophysical sensor streamers in a body of water, comprising:
    moving a towing vessel at a selected speed relative to the surface of the body of water;
    towing at least one of the one or more streamers from the vessel at a selected depth in the water;
    measuring a velocity of the streamer relative to the water at at least one position along the streamer remote from the vessel; and
    adjusting the selected speed of the towing vessel if the measured velocity exceeds a selected threshold.

2. The method of claim 1 further comprising adjusting an angle of attack of a depth control surface of a depressor at a forward end of the streamer to maintain a selected downward force on the streamer in response to the adjusted selected speed.

3. The method of claim 1 wherein the velocity is measured using an acoustic Doppler current profiler.

4. The method of claim 1 wherein geophysical sensors on the streamer comprise at least one of magnetometers, wire loops, and spaced apart electrode pairs.

5. The method of claim 1 further comprising:
    measuring a lateral position of the streamer in the water at at least one position along the streamer remote from the vessel; and
    adjusting the lateral position of the streamer with a lateral force and control device proximate the at least one position along the streamer.

6. The method of claim 5 further comprising adjusting an angle of attack of at least one of the lateral force and control device and a depth control surface of a depressor at a forward end of the streamer to maintain a selected downward force on the streamer in response to the adjusted selected speed.

7. The method of claim 5 further comprising:
    measuring a plurality of lateral positions of the streamer in the water at a plurality of positions along the streamer remote from the vessel; and
    adjusting the lateral position of the streamer with a plurality of lateral force and control devices proximate the plurality of positions along the streamer.

8. The method of claim 1, further comprising:
    measuring a plurality of velocities of the streamer relative to the water at a plurality of positions along the streamer remote from the vessel; and
    adjusting the selected speed of the towing vessel if the measured velocities exceed a selected threshold.

9. A marine geophysical survey system comprising:
    a towing vessel configured to be moved at a selected speed relative to a surface of a body of water;
    a geophysical sensor streamer connected to the towing vessel configured to be towed thereby at a selected depth in the body of water;
    a velocity measuring device located on the streamer at a position remote from the vessel and configured to measure the velocity of the streamer relative to the water at the position; and
    a recording system configured to adjust the selected speed of the towing vessel if the measured velocity exceeds a selected threshold.

10. The system of claim 9 wherein the velocity measuring device comprises an acoustic Doppler current profiler.

11. The system of claim 9 wherein the velocity measuring device is configured to transmit velocity measurement signals to the towing vessel.

12. The system of claim 9 further comprising a depressor at a forward end of the streamer.

13. The system of claim 12 wherein the depressor comprises at least one of a depth control surface and a rudder.

14. The system of claim 12 wherein the depressor is configured to receive control signals from the towing vessel.

15. The system of claim 9 further comprising a lateral force and control device on the streamer remote from the vessel.

16. The system of claim 15 wherein the lateral force and control device is configured to receive control signals from the towing vessel.

17. The system of claim 15, further comprising a plurality of lateral force and control devices on the streamer remote from the vessel.

18. The system of claim 9 further comprising a lateral position measuring device on the streamer remote from the vessel.

19. The system of claim 18 wherein the lateral position measuring device is a component of an acoustic range finding system.

20. The system of claim 18, further comprising a plurality of lateral position measuring devices on the streamer remote from the vessel.

21. The system of claim 18 wherein the lateral position measuring device is conjured to transmit lateral position measurement signals to the towing vessel.

22. The system of claim 9 wherein the streamer comprises a plurality of longitudinally spaced apart electromagnetic sensors.

23. The system of claim 9, further comprising a plurality of velocity measuring devices on the streamer remote from the vessel.

24. A method of geophysical surveying comprising:
    moving a towing vessel at a selected speed relative to a surface of a body of water;
    towing a geophysical sensor streamer from the vessel at a selected depth in the water;
    actuating an energy source in the water to impart energy into formations below the body of water;

detecting energy in response to the energy imparted into the formations with sensors disposed along the streamer;

measuring a velocity of the streamer relative to the water at at least one position along the streamer remote from the vessel; and adjusting the selected speed of the towing vessel if the measured velocity exceeds a selected threshold.

25. The method of claim 24 wherein the energy source is an electromagnetic energy source, the detected energy comprises components of electromagnetic energy, and the sensors are electromagnetic sensors.

26. The method of claim 24, further comprising:

measuring a plurality of velocities of the streamer relative to the water at a plurality of positions along the streamer remote from the vessel; and adjusting the selected speed of the towing vessel if the measured velocities exceed a selected threshold.

\* \* \* \* \*